(No Model.)  3 Sheets—Sheet 1.
D. P. TIPTON.
CURRY COMB.
No. 384,800. Patented June 19, 1888.
Fig. 1.
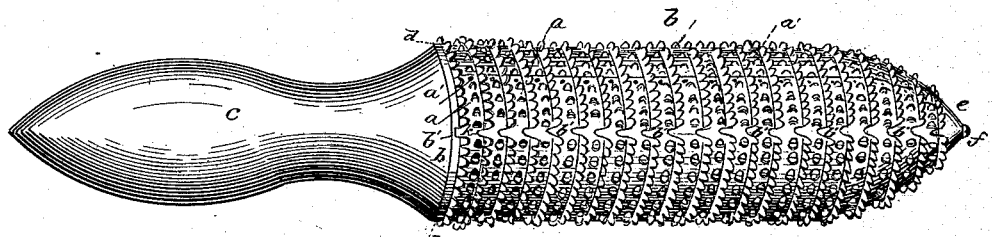
Fig. 2.  Fig. 3.
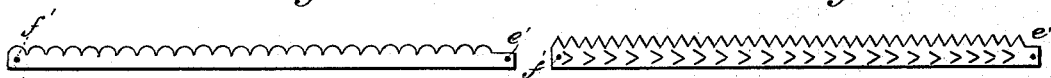 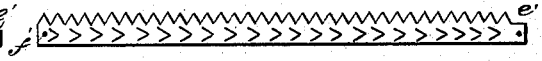
Fig. 4.  Fig. 5.
 
Fig. 6.
Fig. 7.  Fig. 8.  Fig. 9.
  
Fig. 10.  Fig. 11.
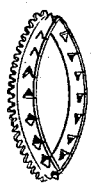 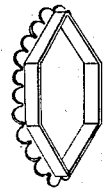
WITNESSES:  INVENTOR.
Thos M Talbott  D. P. Tipton
George B. Pfeiffer
N. PETERS. Photo-Lithographer, Washington, D. C.

(No Model.) 3 Sheets—Sheet 2.

D. P. TIPTON.
CURRY COMB.

No. 384,800. Patented June 19, 1888.

WITNESSES:
Thos. M. Talbott
George B. Pfeiffer

INVENTOR,
D. P. Tipton (No Model.) 3 Sheets—Sheet 3.

D. P. TIPTON.
CURRY COMB.

No. 384,800. Patented June 19, 1888.

WITNESSES:
Thos. M. Talbott
George B. Pfeiffer

INVENTOR,
D. P. Tipton

UNITED STATES PATENT OFFICE.

DIE P. TIPTON, OF BROWNVILLE, NEBRASKA.

CURRY-COMB.

SPECIFICATION forming part of Letters Patent No. 384,800, dated June 19, 1888.

Application filed March 26, 1888. Serial No. 268,546. (No model.)

*To all whom it may concern:*

Be it known that I, DIE P. TIPTON, a citizen of the United States, residing at Brownville, in the county of Nemaha and State of Nebraska, have invented a new and useful Improvement in Curry-Combs, of which the following is a specification.

My invention consists in making curry-combs of elongated, cylindrical, or equivalent form, with conical ends, by threading toothed bands or rings upon central cores or formers. This comb is an improvement upon the comb described in my application Serial No. 252,608, filed October 17, 1887, and, being in form identical with said comb, possesses all the advantages peculiar to said form—namely, capacity for rotation about its longitudinal axis, adjustability to all those portions of an animal's body where the surface is uneven, as the elbow, hock-joint, between the front legs, between the pastern-joint and the hoof—besides being superior to the ordinary curry-comb upon the smooth parts of the body. That which is claimed in said application Serial No. 252,608 is disclaimed in this.

Figure 12:
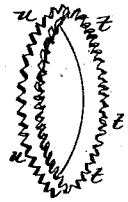
Figure 13:
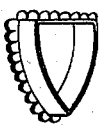
Figure 14:
Figure 15:
Figure 16:
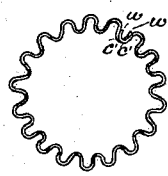
Figure 17:
Figure 18:
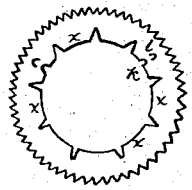
Figure 19:
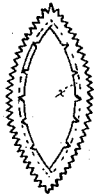
Figure 20:
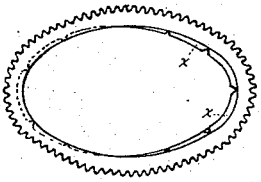
Figure 21:
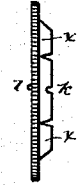
Figure 22:
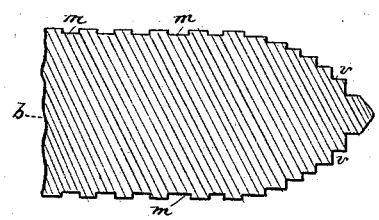
Figure 23:
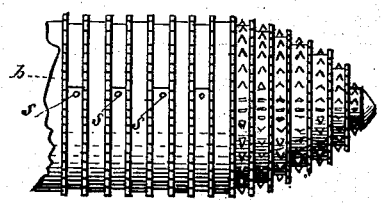
Figure 24:
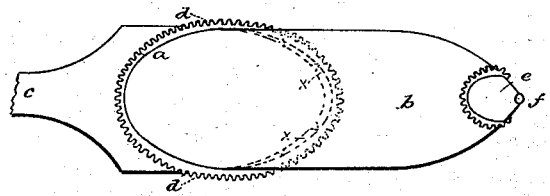
Figure 25:
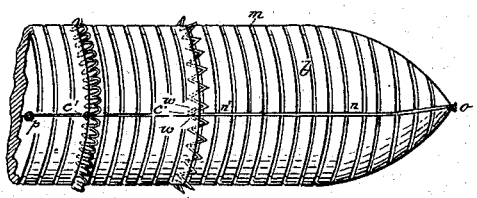
Figure 26:
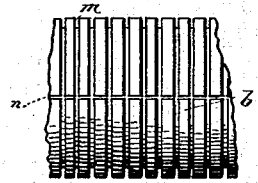
Figure 27:
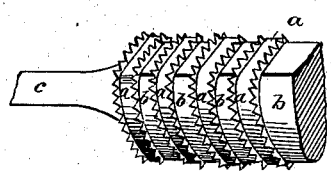
Figure 28:
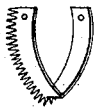

Figure 1 is a side elevation of said comb. Figs. 2, 3, 4, 5, and 6 show strips of sheet metal from which toothed rings or bands are formed, said figures showing different patterns and arrangements of teeth before they are turned or struck up, as they must stand perpendicular to the planes of said strips. Figs. 7, 8, 9, and 10 show rings formed, respectively, from the strips shown in Figs. 3, 4, 5, and 6. Fig. 11 shows a polyhedral band formed from the strip shown in Fig. 2. Fig. 12 shows a ring with a row of teeth on each edge formed from the strip shown in Fig. 4, but with the upper parts of the teeth on the edge $t$ bent one-quarter around, so that said upper parts stand at right angles to the teeth on the edge $u$. Fig. 13 shows a semi-cylindrical band with a flat top formed from the strip shown in Fig. 2. Fig. 14 shows a piece of crimped wire. Fig. 15 shows a zigzag strip cut from sheet metal. Fig. 16 shows a ring formed from the crimped wire shown in Fig. 14. Fig. 17 shows a ring formed from the zigzag piece of sheet metal shown in Fig. 15. Figs. 18, 19, and 20 show rings stamped from sheet metal, Figs. 19 and 20 showing their inner bearing surfaces turned out at right angles to their webs, Fig. 20 also showing an elliptical ring. Fig. 21 shows an edge view of a ring similar to that shown in Fig. 18, except that the inner bearing-surface does not stand at right angles to the web of the ring, but is made to conform to the surface of the conical end of the core, on which said ring is to be placed. Fig. 22 shows a vertical section of a portion of a cylindrical former, with grooves extending around it for the reception of bands formed from strips united at their ends after being bent around the former. This figure also shows a conical end of a core or former with steps or shoulders $v$ cut around it for the reception of rings whose inner bearing surfaces stand at right angles to their webs. Fig. 23 shows the former shown in Fig. 22 with the rings upon it. Fig. 24 shows elliptical rings like that shown in Fig. 20, placed diagonally on a cylindrical former, and also shows an elliptical concave metal cap at the point of the conical end. Fig. 25 shows the manner of placing and securing upon the former or core the wire and zigzag metal rings shown, respectively, in Figs. 16 and 17. Fig. 26 shows a portion of a cylindrical former grooved for the reception of the bands shown in Figs. 16 and 17. Fig. 27 is a perspective view of a portion of a comb wherein the bands, similar to that shown in Fig. 13, are placed upon a semi-cylindrical former. Fig. 28 shows a semi-cylindrical band with an open top, which may be tacked upon a semi-cylindrical former.

In Fig. 1 the comb is formed by threading the rings $a$ on the core or former $b$, the ring nearest the handle $c$ resting against the shoulder $d$ and the ring nearest the point of the conical end being held in place and pressed back against the other rings by the metal cap $e$ and the screw or nail $f$.

In order to prevent the rings from revolving around the core or former, the ring nearest the handle of the device may be secured to the core by a tack, as shown at $a'$, Fig. 1, or one of the teeth may have its point bent at right angles to the body of the tooth, as shown in Fig. 7 at $i$, and then said tooth can be pressed down until the point enters the core, Fig. 1, at $b'$. A tooth on the next band is then pressed down and enters a notch, k, on the first band. A third band is secured to the second in the same way, and so on until all are attached together. Rings like those shown in Figs. 18, 19, and 21 may be connected with each other on the former by cutting a notch in the inside bearing-surface, as shown at k, Figs. 18 and 21, and by forming a corresponding tooth or projection, l, from a part of the web of the ring, so that when it is pressed down it will fit into the notch on the inner bearing-surface of the next ring. When the wire and zigzag metal rings (shown, respectively, in Figs. 16 and 17) are used, they are snugly fitted into the narrow grooves shown at m in Figs. 25 and 26, which grooves help to hold said rings on their edges. The rings are placed on the former so that their ends w overlap and the points c' lie in a groove, n, Figs. 25 and 26, which extends along the core or former parallel to its length. A wire or strip of sheet metal, n', is then inserted and pressed down into said groove n and secured at its ends o and p. In this manner the ends of the rings are held together and prevented from coming out of the grooves. When rings formed from the strips shown in Figs. 2, 3, 4, and 6 are used, said strips are bent around the former and their ends are overlapped and secured together and also to the former by one tack or screw penetrating both ends of the strips through the holes e' and f' and extending into the former, as shown at a', Fig. 1. When rings with teeth on both edges, like those shown in Figs. 8 and 12, are used, it is unnecessary to place them in contact with each other on the core, but spaces may be left between them, and they may be secured at proper distances apart by being placed in the grooves m. (Shown in Fig. 22.) The elliptical rings, like that shown in Fig. 20, are to be placed diagonally on a former. Fig. 24 shows this manner of construction, but only shows two bands or rings, instead of showing the entire surface of the former covered, in order that the diagonal arrangement may be more clearly seen. The cap e at the point of the conical end is elliptical in shape, in order that it may properly fit against the ring next to it. The ends of the strip shown in Fig. 5 are formed with reference to being soldered together or brazed, and are therefore not punctured. Of course the rings used on the conical end of this comb decrease in size as they approach the point of said end.

Having thus described my invention, what I claim, and desire to secure by Letters Patent, is—

1. A curry-comb of cylindrical or equivalent shape formed from toothed rings or bands secured upon a suitable core or former, substantially as shown and described.

2. A curry-comb of cylindrical or equivalent shape formed from toothed rings or bands secured upon a grooved former or core, substantially as shown and described.

3. A curry-comb of cylindrical or equivalent shape formed from toothed rings or bands secured upon a grooved former or core having a conical end, substantially as shown and described.

4. A curry-comb of cylindrical or equivalent shape formed from rings or bands having teeth struck up from their surfaces, said rings or bands being secured upon a core or former, substantially as shown and described.

5. A curry-comb of cylindrical or equivalent shape formed from rings or bands having a double row of teeth formed therefrom, said rings or bands being secured upon a core or former, substantially as shown and described.

6. A curry-comb of cylindrical or equivalent form formed from toothed rings or bands secured upon a former or core, said rings or bands having notches and projections to enter said notches, whereby to prevent independent rotation upon the core or former, substantially as shown and described.

7. In a curry-comb of cylindrical or equivalent shape, the combination of toothed rings or bands with a former or core having a conical end provided with steps or shoulders, substantially as shown and described.

8. A curry-comb of cylindrical or equivalent shape, consisting of a core or former having a handle at one end and a series of toothed rings or bands secured upon said former or core, all substantially as shown and described.

DIE P. TIPTON.

Witnesses:
R. W. TALBOTT,
THOS. M. TALBOTT.